(12) United States Patent
Zou et al.

(10) Patent No.: US 12,403,867 B2
(45) Date of Patent: Sep. 2, 2025

(54) SELF-CLEANING SENSOR SYSTEM OF A MOTOR VEHICLE

(71) Applicant: GM Global Technology Operations LLC, Detroit, MI (US)

(72) Inventors: Guangyu Jeff Zou, Warren, MI (US); Andrew W. Averhart, Redford, MI (US); Joseph George Machak, Oakland Township, MI (US); Sai Vishnu Aluru, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 659 days.

(21) Appl. No.: 17/840,832

(22) Filed: Jun. 15, 2022

(65) Prior Publication Data

US 2023/0406268 A1   Dec. 21, 2023

(51) Int. Cl.
| | |
|---|---|
| *B60S 1/56* | (2006.01) |
| *B60S 1/02* | (2006.01) |
| *B60S 1/48* | (2006.01) |
| *B60S 1/54* | (2006.01) |
| *G01S 17/931* | (2020.01) |

(52) U.S. Cl.
CPC ............ *B60S 1/56* (2013.01); *B60S 1/023* (2013.01); *B60S 1/481* (2013.01); *B60S 1/54* (2013.01); *G01S 17/931* (2020.01)

(58) Field of Classification Search
None
See application file for complete search history.

(56) References Cited

U.S. PATENT DOCUMENTS

| | | |
|---|---|---|
| 6,944,908 B2 | 9/2005 | Hoetzer et al. |
| 6,992,706 B2 | 1/2006 | Mabuchi et al. |
| 9,057,528 B2 | 6/2015 | Browne et al. |
| 10,131,272 B2 | 11/2018 | Ban, Jr. et al. |
| 10,676,070 B2 | 6/2020 | Giraud et al. |
| 10,696,277 B1 | 6/2020 | Rakouki |
| 10,703,341 B2 | 7/2020 | Kunze |
| 10,730,538 B2 | 8/2020 | Mesher |

(Continued)

FOREIGN PATENT DOCUMENTS

| | | |
|---|---|---|
| CN | 110998650 A | 4/2020 |
| CN | 112061083 A | 12/2020 |

(Continued)

*Primary Examiner* — Kaj K Olsen
*Assistant Examiner* — Pradhuman Parihar
(74) *Attorney, Agent, or Firm* — Vivacqua Crane, PLLC

(57) ABSTRACT

A self-cleaning sensor system of a motor vehicle includes an object sensor having a lens surface facing a region located external to the motor vehicle. The object sensor generates a signal associated with an image or a video of the region. The system further includes multiple lens treatment devices for applying remedies for removing an obscurity formed on the lens surface. The system further includes a computer having one or more processors and a computer readable medium storing instructions. The processor is programmed to determine a classification of the obscurity, in response to the processor receiving the signal from the object sensor. The processor is further programmed to generate an actuation signal, and the associated lens treatment device applies the remedy, in response to the associated lens treatment device receiving the actuation signal from the processor.

14 Claims, 5 Drawing Sheets

(56) References Cited

U.S. PATENT DOCUMENTS

| | | | |
|---|---|---|---|
| 10,761,190 | B1 | 9/2020 | Sykula et al. |
| 10,807,623 | B2 | 10/2020 | Mesher |
| 10,845,590 | B2 | 11/2020 | Bombini et al. |
| 10,908,291 | B2 | 2/2021 | Mesher |
| 11,140,301 | B2 | 10/2021 | Condron et al. |
| 11,155,243 | B2 | 10/2021 | Keller et al. |
| 11,173,839 | B2 | 11/2021 | Wilson et al. |
| 11,196,981 | B2 | 12/2021 | Mesher |
| 11,220,241 | B2 | 1/2022 | Melou |
| 2012/0034858 | A1 | 2/2012 | Reichel et al. |
| 2016/0096486 | A1 | 4/2016 | Dziurda et al. |
| 2019/0071058 | A1 | 3/2019 | Grasso et al. |
| 2019/0106085 | A1* | 4/2019 | Bacchus ............ G02B 27/0006 |
| 2019/0310470 | A1 | 10/2019 | Weindorf et al. |
| 2020/0062222 | A1* | 2/2020 | Fukazawa ................ B60S 1/50 |
| 2020/0149933 | A1 | 5/2020 | Robertson et al. |
| 2021/0031732 | A1 | 2/2021 | Alkharabsheh et al. |
| 2021/0101539 | A1 | 4/2021 | Krishnan et al. |
| 2021/0201054 | A1* | 7/2021 | Toth ....................... G06V 20/58 |
| 2021/0221336 | A1 | 7/2021 | Giraud |
| 2021/0253067 | A1 | 8/2021 | Poton et al. |

FOREIGN PATENT DOCUMENTS

| | | |
|---|---|---|
| EP | 3437930 B1 | 7/2021 |
| JP | 2012132988 A | 7/2012 |
| JP | 6552559 B2 | 7/2019 |
| JP | 6640199 B2 | 2/2020 |
| JP | 6992706 A | 1/2022 |
| KR | 20110026220 A | 3/2011 |
| KR | 102351064 B1 | 1/2022 |

\* cited by examiner

SELF-CLEANING SENSOR SYSTEM OF A MOTOR VEHICLE

INTRODUCTION

The present disclosure relates to a motor vehicle having one or more object sensors, and more particularly to a self-cleaning sensor system of a motor vehicle including an object sensor with a lens surface and a lens treatment device for removing an obscurity formed on the lens surface.

Automotive systems can include one or more object sensors to assist drivers with operating the vehicle or to fully operate the vehicle. For instance, an Advanced Driver Assistance System (ADAS) typically includes multiple object sensors in the form of one or more cameras for capturing images of associated regions disposed external to the vehicle. The camera may be used to determine the presence of objects relative to the position of the vehicle. More specifically, the camera can be used to determine the presence of buildings and trees along a roadway, the speed of the vehicle, the position of the vehicle on the roadway (i.e., lane-keeping), and the positions of other vehicles, pedestrians, or other objects that may be moving closer or farther away from the vehicle.

The cameras can be exposed to the environment, and unpredictable inclement weather conditions can severely impair the performance of the cameras. In contrast to hardware malfunctions, impairment caused by inclement weather can be difficult to predict and detect. Images from impaired sensors can lead to false detection of downstream processing modules. Objects that appear in the impaired region could be missed, and a vehicle system can incorrectly recognize the impaired region itself as a false object.

Thus, while existing methods and systems may achieve their intended purpose, there is a need for a method and self-cleaning sensor system that address these issues.

SUMMARY

According to several aspects of the present disclosure, a self-cleaning sensor system of a motor vehicle includes multiple object sensors, with each object sensor having a lens surface facing an associated one of multiple regions located external to the motor vehicle. Each object sensor generates a signal associated with an image and/or a video of the associated region as captured by the object sensor. The system further includes a multiple lens treatment devices for applying an associated one of multiple remedies to the lens surface of each object sensor. The remedies are different from one another, and each remedy is configured to remove an associated classification of an obscurity formed on the lens surface of the associated object sensor. The system further includes a computer including one or more processors electrically communicating with the object sensors and the lens treatment devices. The computer further includes a non-transitory computer readable storage medium storing instructions. The processor is programmed to utilize a multi-task neural network to determine a classification of the obscurity, in response to the processor receiving the signal from the object sensor. The processor is further programmed to generate an actuation signal based on the classification of the obscurity. The processor is further programmed to transmit the actuation signal to the associated lens treatment device. The associated lens treatment device applies the associated remedy to the lens surface, in response to the associated lens treatment device receiving the actuation signal from the processor.

In one aspect, the lens treatment devices include a heat-based lens treatment device for applying heat to the lens surface to remove the obscurity formed on the lens surface of the associated object sensor.

In another aspect, the processor is further programmed to determine that the classification of the obscurity is associated with an ice deposit formed on the lens surface, in response to the processor receiving the signal from the object sensor.

In another aspect, the lens treatment devices include a liquid-based lens treatment device for delivering a pressurized liquid to the lens surface to remove the obscurity formed on the lens surface of the associated object sensor.

In another aspect, the processor is further programmed to determine that the classification of the obscurity is associated with a dirt deposit formed on the lens surface, in response to the processor receiving the signal from the object sensor.

In another aspect, the lens treatment devices include a gas-based lens treatment device for delivering a compressed gas to the lens surface to remove the obscurity formed on the lens surface of the associated object sensor.

In another aspect, the processor is further programmed to determine that the classification of the obscurity is associated with a liquid deposit formed on the lens surface, in response to the processor receiving the signal from the object sensor.

In another aspect, the processor is further programmed to determine that at least a portion of the obscurity is disposed on the lens surface after the lens treatment device applied the associated remedy to the lens surface. The processor is further programmed to count a number of attempts taken to remove the obscurity and compare the number of attempts to a maximum threshold. The processor is further programmed to generate the actuation signal, in response to the processor determining that the number of attempts is below the maximum threshold. The associated lens treatment device applies the associated remedy to the lens surface, in response to the associated lens treatment device receiving the actuation signal from the processor.

According to several aspects of the present disclosure, a self-cleaning sensor system of a motor vehicle includes multiple object sensors having a lens surface facing an associated one of multiple regions located external to the motor vehicle. Each object sensor generates an object signal associated with an image and/or a video of the associated region as captured by the object sensor. The system further includes multiple lens treatment devices for applying an associated one of multiple remedies to the lens surface of each object sensor. The remedies are different from one another, and each remedy is configured to remove an associated classification of an obscurity formed on the lens surface of the associated object sensor. The lens treatment devices include a primary lens treatment device for applying a primary remedy to the lens surface to remove a primary classification of the obscurity. The system further includes a computer having one or more processors electrically communicating with the object sensors and the lens treatment devices. The computer further includes a non-transitory computer readable storage medium storing instructions. The processor is programmed to utilize a multi-task neural network to determine a primary classification of the obscurity, in response to the processor receiving the object signal from the object sensor. The processor is programmed to generate a primary actuation signal based on the primary classification of the obscurity. The processor is programmed to transmit the primary actuation signal to the primary lens treatment device. The primary lens treatment device applies the primary remedy to the lens surface, in response to the primary lens treatment device receiving the primary actuation signal from the processor.

In one aspect, the processor is further programmed to determine that at least a portion of the obscurity is still disposed on the lens surface after the primary lens treatment device applied the primary remedy to the lens surface. The processor is further programmed to count a number of attempts taken to remove the obscurity and compare the number of attempts to a maximum threshold. The processor is further programmed to determine a secondary classification of the obscurity, in response to the processor determining that the number of attempts is below the maximum threshold and the processor further determining that the primary remedy did not remove the entire obscurity. The processor is further programmed to generate a secondary actuation signal based on the secondary classification. The lens treatment devices further include a secondary lens treatment device for applying a secondary remedy to the lens surface, in response to the secondary lens treatment device receiving the secondary actuation signal from the processor.

In another aspect, the processor is further programmed to determine that at least a portion of the obscurity is still disposed on the lens surface after the secondary lens treatment device applied the second remedy to the lens surface. The processor is further programmed to count the number of attempts taken to remove the obscurity and compare the number of attempts to the maximum threshold. The processor is further programmed to determine a tertiary classification of the obscurity, in response to the processor determining that the number of attempts is below the maximum threshold and the processor further determining that the secondary remedy did not remove the entire obscurity. The processor is further programmed to generate a tertiary actuation signal based on the tertiary classification. The lens treatment devices further include a tertiary lens treatment device for applying a tertiary remedy to the lens surface, in response to the tertiary lens treatment device receiving the tertiary actuation signal from the processor.

In another aspect, the system further includes one or more supplemental sensors for generating a supplemental signal associated with the obscurity, with the processor determining an accuracy of the primary classification, the secondary classification, and the tertiary classification based on the supplemental signal.

In another aspect, the supplemental sensors include a temperature sensor for generating a temperature signal indicative of an ambient temperature. One of the primary classification, the secondary classification, and the tertiary classification of the obscurity is associated with an ice deposit formed on the lens surface. The processor determines that the classification is not accurate, in response to the temperature signal indicating that the ambient temperature is above a freezing temperature.

In another aspect, the primary lens treatment device, the secondary lens treatment device, and the tertiary lens treatment device are an associated one of a gas-based lens treatment device for delivering a compressed gas to the lens surface, a liquid-based lens treatment device for delivering a pressurized liquid to the lens surface, and a heat-based lens treatment device for applying heat to the lens surface to remove the obscurity formed on the lens surface of the associated object sensor.

According to several aspects of the present disclosure, a method is provided for operating a self-cleaning sensor system for a motor vehicle. The system includes multiple object sensors, with each object sensor having a lens surface facing an associated one of multiple regions located external to the motor vehicle. The system further includes multiple lens treatment devices including a primary lens treatment device, a secondary lens treatment device, and a tertiary lens treatment device. The system further includes one or more supplemental sensors and a computer having one or more processors and a non-transitory computer readable storage medium storing instructions. The method includes generating, using the object sensor, an object signal associated with an image and/or a video of the region captured by the object sensor. The method further includes determining, using the processor, a primary classification of the obscurity in response to the processor receiving the object signal from the object sensor. The method further includes generating, using the processor, a primary actuation signal based on the primary classification of the obscurity. The method further includes transmitting, using the processor, the primary actuation signal to the primary lens treatment device. The method further includes applying, using the primary lens treatment device, a primary remedy to the lens surface in response to the primary lens treatment device receiving the primary actuation signal from the processor.

In one aspect, the method further includes determining, using the processor, whether the obscurity is still disposed on the lens surface after the primary lens treatment device applied the primary remedy to the lens surface. The method further includes counting, using the processor, a number of attempts taken to remove the obscurity and comparing, using the processor, the number of attempts to a maximum threshold. The method further includes determining, using the processor, a secondary classification of the obscurity in response to the processor determining that the number of attempts is below the maximum threshold and the processor further determining that the primary remedy did not remove the entire obscurity. The method further includes generating, using the processor, a secondary actuation signal based on the secondary classification. The method further includes applying, using the secondary lens treatment device, a secondary remedy to the lens surface in response to the secondary lens treatment device receiving the secondary actuation signal from the processor.

In another aspect, the method further includes determining, using the processor, whether the obscurity is still disposed on the lens surface after the secondary lens treatment device applied the secondary remedy to the lens surface. The method further includes counting, using the processor, the number of attempts taken to remove the obscurity and comparing, using the processor, the number of attempts to the maximum threshold. The method further includes determining, using the processor, a tertiary classification of the obscurity in response to the processor determining that the number of attempts is below the maximum threshold and the processor further determining that the secondary remedy did not remove the obscurity. The method further includes generating, using the processor, a tertiary actuation signal based on the tertiary classification. The method further includes applying, using the tertiary lens treatment device, a tertiary remedy to the lens surface in response to the tertiary lens treatment device receiving the tertiary actuation signal from the processor.

In another aspect, the method further includes generating, using the supplemental sensor, a supplemental signal associated with the obscurity. The method further includes determining, using the processor, an accuracy of the primary classification, the secondary classification, and/or the tertiary classification based on the supplemental signal.

In another aspect, the method further includes generating, using a temperature sensor, a temperature signal indicative of an ambient temperature. The method further includes determining, using the processor, that the primary classification, the secondary classification, and/or the tertiary classification associated with an ice deposit is not accurate in response to the temperature signal indicating that the ambient temperature is above a freezing temperature.

In another aspect, the method further includes delivering, using a gas-based lens treatment device, a compressed gas to the lens surface to remove the obscurity formed on the lens surface of the object sensor. The method further includes delivering, using a liquid-based lens treatment device, a pressurized liquid to the lens surface to remove the obscurity formed on the lens surface of the object sensor. The method further includes applying, using a heat-based lens treatment device, heat to the lens surface to remove the obscurity formed on the lens surface of the object sensor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
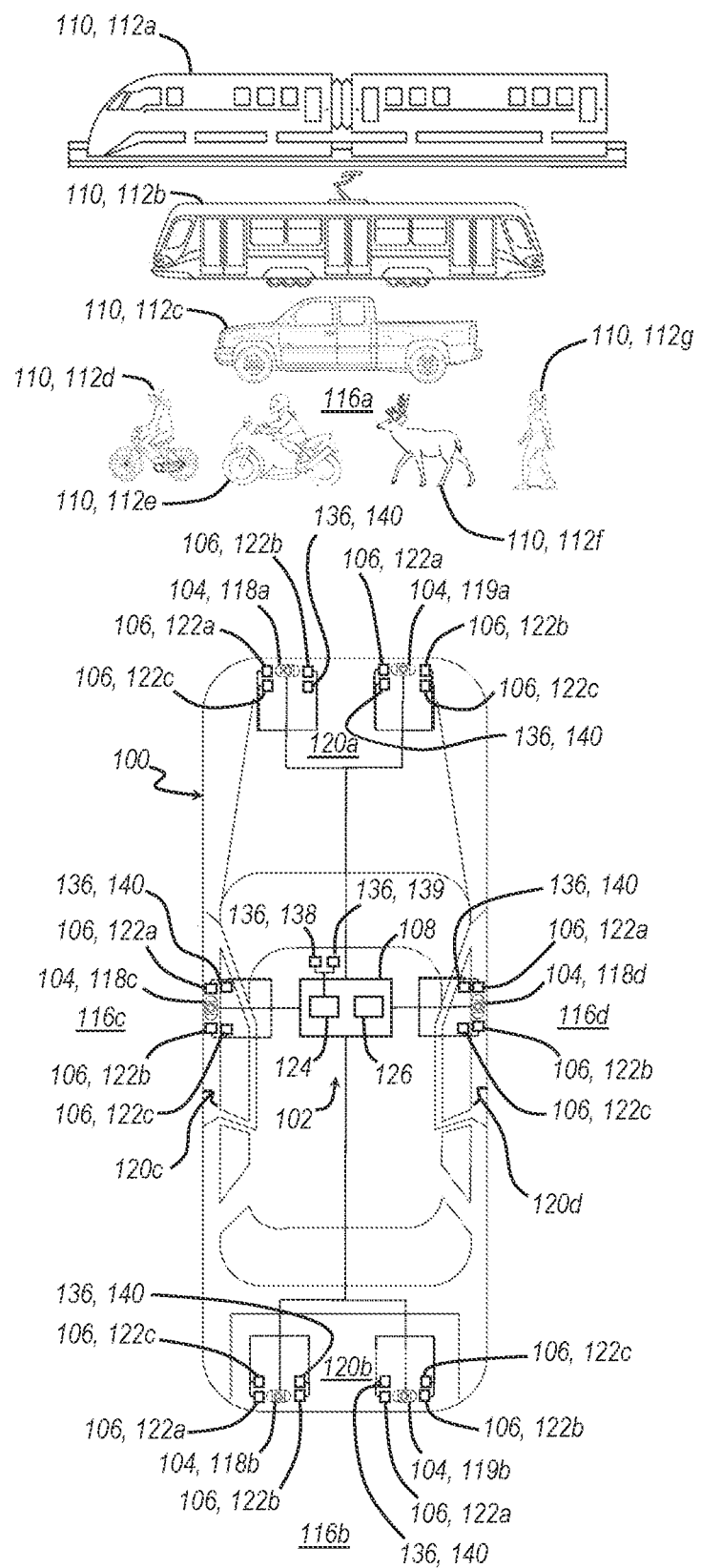
FIG. 1 is a schematic diagram of one example of a motor vehicle having a self-cleaning sensor system including one or more object sensors for detecting multiple objects positioned within regions external to the motor vehicle and multiple lens treatment devices for removing obscurities formed on the object sensors.

Referring to FIG. 1, one non-limiting example of a motor vehicle 100 includes a self-cleaning sensor system 102 having multiple object sensors 104 and multiple lens treatment devices 106 for applying associated remedies to each object sensor 104 to remove an obscurity 128 (FIG. 2) impairing the object sensor 104. The system 102 further includes a computer 108 with a multi-task neural network configured to monitor in real-time an image stream generated by the object sensor. Once the computer 108 determines that the object sensor 104 is impaired, the computer 108 outputs the classification of the obscurity (e.g., frost, water drop, mud, etc.) and an optional 2D mask to indicate impaired regions, which in turn triggers appropriate self-restoring procedures.

Non-limiting examples of the motor vehicle can include a land vehicle, such as a sedan, a light duty truck, a heavy duty truck, a sport utility vehicle, a van, or a motor home. The motor vehicle 100 can be an autonomous vehicle, a semi-autonomous vehicle, or a non-autonomous (manual) vehicle. Non-limiting examples of the object 110 can include a train 112a, a streetcar 112b, another vehicle 112c, a bicyclist 112d, a motorcyclist 112e, an animal 112f, or a pedestrian 112g. However, it is contemplated that the system can detect other suitable motor vehicles and objects that are positioned external to the motor vehicle and facing the object sensor 104.

Each of the object sensors 104 has a lens surface 114 (FIG. 2) or emitter surface that faces an associated one of the regions 116a-116d located external to the motor vehicle 100. The object sensor 104 is configured to generate a signal associated with an image and/or a video of the associated region. The object sensors 104 can include a forward facing camera 118a and a forward radar device 119a attached to a front end structure 120a of the motor vehicle 100 for capturing images and video of objects positioned within the region 116a that is located forward of the motor vehicle 100. The object sensors 104 can further include a rear facing camera 118b and a rear facing radar device 119b attached to a rear end structure 120b of the motor vehicle 100 for capturing images and video of objects positioned within the region 116b that is located rearward of the motor vehicle 100. The object sensors 104 can further include a driver side camera 118c attached to a driver side 120c of the motor vehicle 100 for capturing images and video of objects positioned within the region 116c that is located proximal to the driver side 120c of the motor vehicle 100. The object sensors 104 can further include a passenger side camera 118d attached to a passenger side 120d of the motor vehicle 100 for capturing images and video of objects positioned within the region 116d that is located proximal to the passenger side 120d of the motor vehicle 100. The cameras can be monocular, stereo, or infrared cameras. Other non-limiting examples of the object sensors 104 can include other cameras, radar devices, ultrasonic devices, and/or lidar devices mounted to any suitable portion of the motor vehicle 100. In still other non-limiting examples, it is contemplated that the object sensors can include cameras or any other object sensor, which face an interior of a passenger cabin and may be susceptible to a cracked lens and/or contaminants (e.g., dust, spilled beverages, spilled food, etc.).

Figure 2:
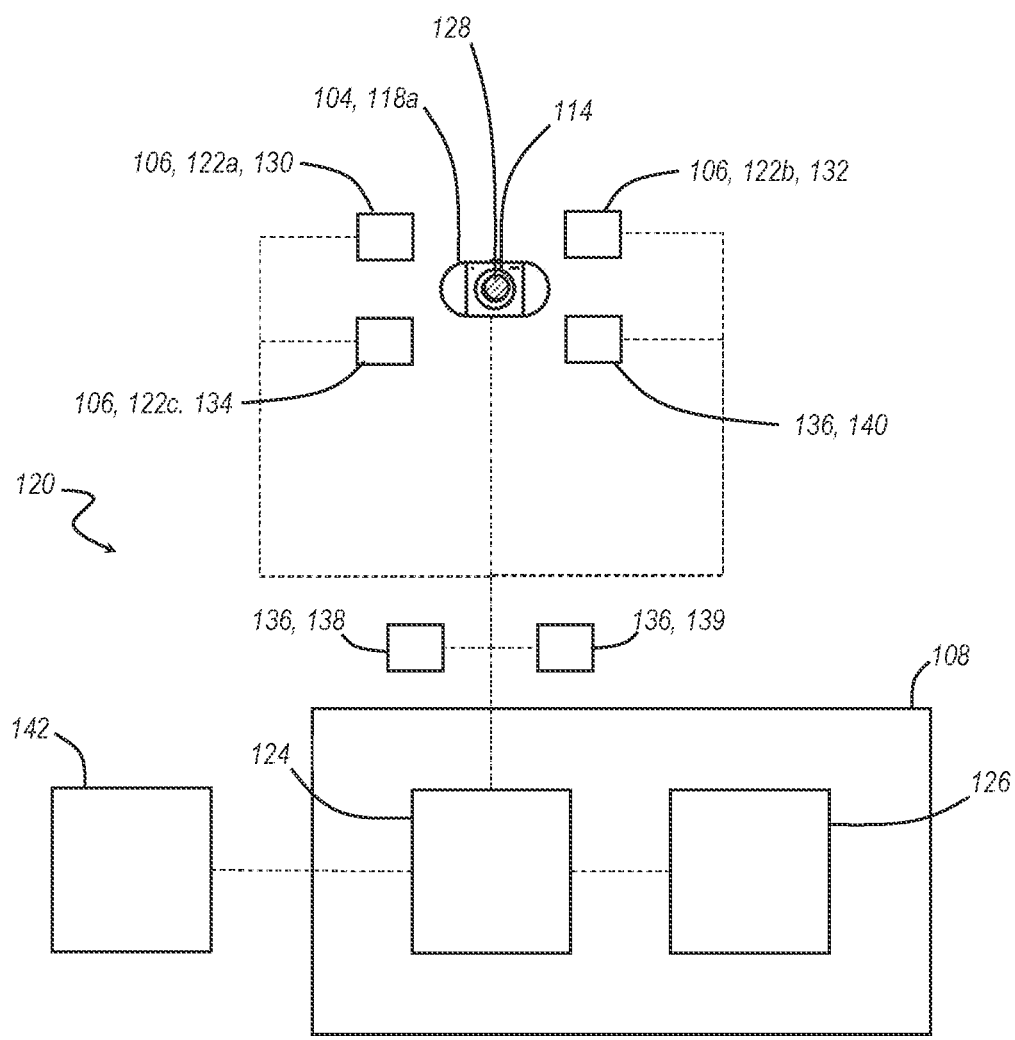
FIG. 2 is an enlarged view of a portion of the self-cleaning sensor system of FIG. 1, illustrating one of the object sensors with an obscurity formed on a lens surface and multiple supplemental sensors for corroborating detection of the obscurity.

Referring to FIG. 2, each of the lens treatment devices 106 is configured to apply an associated one of multiple remedies to the lens surface 114 to remove an associated classification of obscurity 128 formed on the lens surface 114 of the object sensor 104. The remedies can be different from one another, and each one of the remedies is configured to remove an associated classification of obscurity 128 formed on the lens surface 114. More specifically, one non-limiting example of the lens treatment devices 106 can be a gas-based lens treatment device 122a for delivering a compressed gas to the lens surface 114 to remove the obscurity 128 (e.g., water droplets) formed on the lens surface 114. Another non-limiting example of the lens treatment devices 106 can be a liquid-based lens treatment device 122b for delivering a pressurized liquid to the lens surface 114 to remove the obscurity 128 (e.g., mud, road dirt, etc.) formed on the lens surface 114. Still another non-limiting example of the lens treatment devices 106 can be a heat-based lens treatment device 122c (e.g., heat resistive wire element) for applying heat (e.g., radiative heat) to the lens surface 114 to remove the obscurity 128

(e.g., ice or a layer of ice) on the lens surface 114. In other examples, the system 102 can include any combination of these or other suitable lens treatment devices for removing obscurities from the object sensors 104.

The system 102 further includes the computer 108 having one or more processors 124 electrically communicating with the object sensors 104 and the lens treatment devices 106. The computer 108 further includes a non-transitory computer readable storage medium 126 storing instructions. The processor 124 is programmed to utilize a classifier, such as a multi-task deep neural network ("DNN"), to determine a classification or category of the obscurity 128 and the region associated with the object sensor having the obscurity 128, in response to the processor 124 receiving the signals from the object sensors 104. It is contemplated that the system can utilize other suitable classifiers. In this non-limiting example, the DNN utilizes a "softmax" function to determine the classification by modeling the probabilities of the obscurity 128 belonging to each classification across all classifications, which can be defined by Equation 1:

$$\text{softmax}(x) = \frac{1}{\sum_{j=1}^{K} \exp(x_j)} \begin{bmatrix} \exp(x_1) \\ \exp(x_2) \\ \vdots \\ \exp(x_K) \end{bmatrix} \quad \text{Eq. 1}$$

where K represents a number of the classifications, $x_j$ represents the jth element of the real value vector x from the DNN, and softmax(x) represents a transformed real value vector, where all elements range from (0,1) and sum up to 1.

Also in this non-limiting example, the DNN uses a binary mask to indicate the location and shape of the region where the impairment is in the field of view of the associated object sensor 104. The DNN uses a "sigmoid" function to model a binary probability for each pixel to determine that the pixel belongs to an impaired region or an intact region, which can be defined by Equation 2:

$$\sigma(x) = \frac{1}{1 + e^{-x}} \quad \text{Eq. 2}$$

where x represents a real value from the DNN for each cell of a 2D grid, the shape of which corresponds to the shape of the original input image, and σ(x) represents a transformed real value in the range of (0,1).

More specifically, in this non-limiting example, the processor 124 is programmed to utilize the DNN to determine that the classification of the obscurity 128 is associated with a liquid deposit (e.g., rain droplets), a dirt deposit (e.g., mud or road dirt), ice (e.g., frost or a layer of ice), a cracked lens surface, and/or a wiper moving in the field of view of the object sensor, in response to the processor 124 receiving the signal from the associated object sensor 104. The processor 124 is further configured to generate an actuation signal based on the classification of the obscurity 128 and transmit the actuation signal to the associated lens treatment device 106.

The associated lens treatment device 106 applies the remedy to the lens surface, in response to the associated lens treatment device 106 receiving the actuation signal from the processor 124. Continuing with the previous example, the gas-based lens treatment device 122a delivers the compressed gas to the lens surface 114 to remove the liquid deposit (e.g., rain drops) from the lens surface 114, in response to the gas-based lens treatment device 106 receiving the actuation signal from the processor 124. The liquid-based lens treatment device 122b delivers the pressurized liquid (e.g., cleaning fluid) to the lens surface 114 to remove the dirt deposit (e.g., mud or road dirt) from the lens surface 114, in response to the liquid-based lens treatment device 106 receiving the actuation signal from the processor 124. The heat-based lens treatment device 122c (e.g., the heat resistive wire element) applies heat to the lens surface 114 to remove ice (e.g., frost or layer of ice) formed on the lens surface 114, in response to the heat-based lens treatment device 106 receiving the actuation signal from the processor 124.

Also, in this non-limiting example, the system 102 applies an iteration of the remedies until the processor 124 accurately determines the classification of the obscurity and/or one of the lens treatment devices 106 (e.g., a primary lens treatment device 122a, a secondary lens treatment device 122b, a tertiary lens treatment device 122c, etc.) has removed the entire obscurity from the object sensor 104. More specifically, the processor 124 is programmed to determine a primary classification of the obscurity 128, in response to the processor 124 receiving the object signal from the object sensor 104. The processor 124 is further programmed to generate a primary actuation signal based on the primary classification of the obscurity 128. The processor 124 is further programmed to transmit the primary actuation signal to a primary lens treatment device 130. The primary lens treatment device 130 applies a primary remedy to the lens surface 114, in response to the primary lens treatment device 130 receiving the primary actuation signal from the processor 124. It is contemplated that the system can include other suitable lens treatment devices for applying associated remedies to the lens surface.

The processor 124 is further programmed to determine that at least a portion of the obscurity is still disposed on the lens surface 114 after the primary lens treatment device 130 applied the primary remedy to the lens surface 114. The processor 124 is further programmed to count a number of attempts taken to remove the obscurity 128 and compare the number of attempts to a maximum threshold. The processor 124 is further programmed to determine a secondary classification of the obscurity, in response to the processor 124 determining that the number of attempts is below the maximum threshold and in further response to the processor 124 determining that the primary remedy did not remove the entire obscurity. The processor 124 is further programmed to generate a secondary actuation signal and transmit the secondary actuation signal to the secondary lens treatment device 130, in response to the processor 124 determining that the number of attempts is below the maximum threshold. The secondary lens treatment device 132 applies a secondary remedy to the lens surface 114, in response to the secondary lens treatment device 132 receiving the secondary actuation signal from the processor 124.

The processor 124 is further programmed to determine that at least a portion of the obscurity 128 is disposed on the lens surface 114 after the secondary lens treatment device 132 applied the secondary remedy to the lens surface 114. The processor 124 is further programmed to count the number of attempts taken to remove the obscurity 128 and compare the number of attempts to the maximum threshold. The processor 124 is further programmed to determine a tertiary classification of the obscurity 128, in response to the processor 124 determining that the number of attempts is below the maximum threshold and in further response to the processor 124 determining that the secondary remedy did not remove the entire obscurity 128. The processor 124 is further programmed to generate a tertiary actuation signal based on the tertiary classification and transmit the tertiary actuation signal to the tertiary lens treatment device 134. The tertiary lens treatment device 134 applies a tertiary remedy to the lens surface 114, in response to the tertiary lens treatment device 134 receiving the tertiary actuation signal from the processor 124.

The primary lens treatment device 130, the secondary lens treatment device 132, and the tertiary lens treatment device 134 can be any associated one of the gas-based lens treatment device 122a, the liquid-based lens treatment device 122b, and the heat-based lens treatment device 122c.

Also, in this non-limiting example, the system 102 further includes one or more supplemental sensors 136 for generating a supplemental signal associated with the obscurity 128, where the processor 124 determines an accuracy of the primary classification, the secondary classification, and the tertiary classification based on the supplemental signal. In particular, the supplemental sensors 136 include a temperature sensor 138 generating a temperature signal indicative of an ambient temperature. The processor 124 determines that the classification is not accurate when the primary classification, the secondary classification, and the tertiary classification of the obscurity is associated with an ice deposit (e.g., frost, a layer of ice, etc.) formed on the lens surface 114, and in response to the temperature signal indicating that the ambient temperature is above a freezing temperature. It is contemplated that other non-limiting examples of the supplemental sensor can include a wheel encoder 139, a dirt detection sensor 140, or other suitable sensors.

Figure 3:
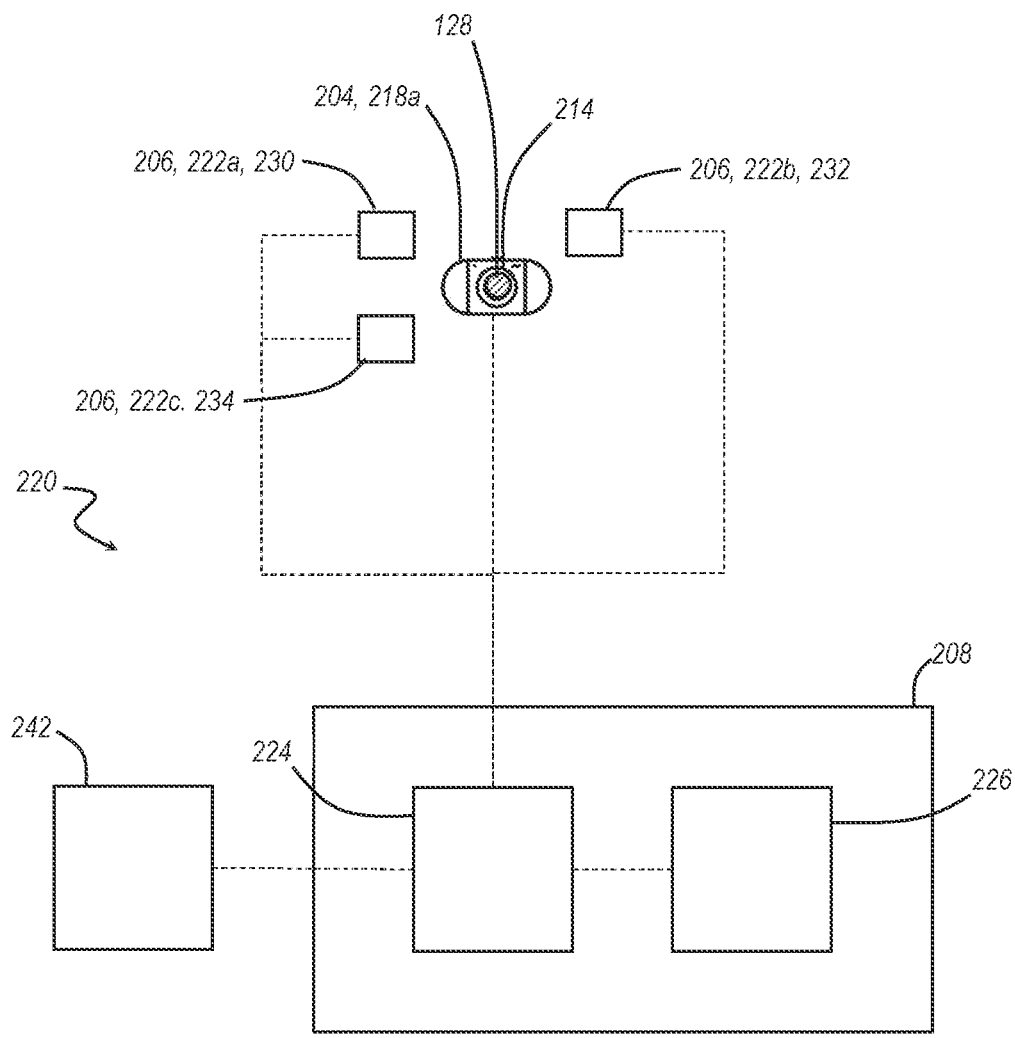
FIG. 3 is an enlarged view of another example of a self-cleaning sensor system of FIG. 2, illustrating the system without the supplemental sensors.

Referring to FIG. 3, a self-cleaning system 202 is similar to the system 102 of FIG. 1 and has similar components identified by the same numbers increased by 100. However, while the system 102 includes supplemental sensors 136 (e.g., the temperature sensor 138, a wheel encoder 139, and a dirt detection sensor 140) for multi-modal sensor-based triggering, the system 202 does not include supplemental sensors.

Figure 4:
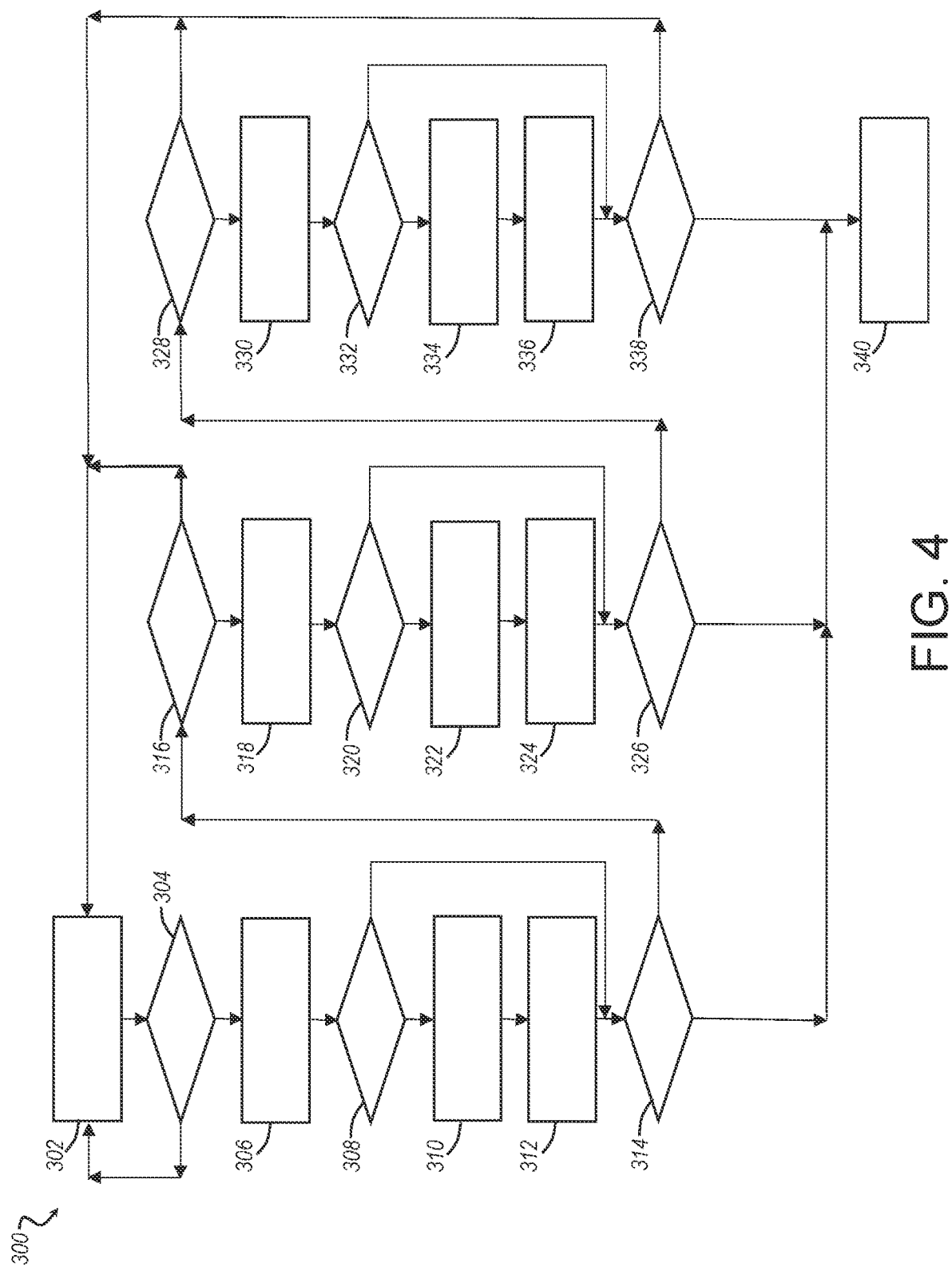
FIG. 4 is a flow chart of one example of a method for operating the self-cleaning sensor system of FIG. 1.

Referring to FIG. 4, a method 300 for operating the self-cleaning sensor system of FIG. 1 begins at block 302, with the first and second object sensors of different modalities (e.g., the camera 118a and the radar device 119a directed to a common forward region 116a or the camera 118b and the radar device 119b directed to a common rear region 116b) generating associated first and second signals for images and/or videos of objects positioned in the common region.

At block 304, the method 300 further includes determining, using the processor 124, whether the first and second object sensors 104 corroborate one another. More specifically, if the processor 124 determines that first and second object sensors 104 are only detecting common objects in the common region, the processor 124 determines that neither one of the first and second object sensors 104 has an obscurity and the method 300 returns to block 302. If the processor 124 does not determine that the first and second object sensors are only detecting common objects in the common region (e.g., the processor determines that one of the first and second object sensors 104 detects an object in the common region that is not detected by the other of the first and second object sensors 104), the processor 124 determines that the uncommon object is an obscurity 128 and the method 300 proceeds to block 306 for each one of the first and second object sensors 104. One non-limiting benefit of determining consistency among the object sensors is that the system 102 can preserve computational and memory bandwidth, where the processor determines in block 302 that none of the first and second object sensors 104 has the obscurity. While blocks 302 through 340 are directed to the first object sensor 104, the method 300 repeats blocks 302 through 340 for the each one of the remaining object sensors 104. In other examples, the method may not include blocks 302 and 304.

At block 306, the method 300 further includes determining, using the DNN of the processor 124, the primary classification of the obscurity according to Equation 1, in response to the processor 124 receiving the first object signal from the first object sensor 104. Non-limiting examples of the primary classification can be associated with the liquid deposit, the dirt deposit, the ice deposit, the cracked lens surface, and/or the wiper moving in the field of vision of the first object sensor 104. In this non-limiting example, the primary classification can be the liquid deposit.

At block 308, the method 300 further includes generating, using the supplemental sensor 136, the supplemental signal associated with the obscurity and determining, using the processor 124, the accuracy of the primary classification based on the supplemental signal. In one non-limiting example, the primary classification is associated with the liquid deposit, and the supplemental sensor 136 is the temperature sensor 138. More specifically, in this non-limiting example, the method 300 includes generating, using the temperature sensor 138, the temperature signal indicative of the ambient temperature. The method 300 further includes determining, using the processor 124, that the temperature sensor 138 does not corroborate the first object sensor 104 and further that the primary classification (e.g., associated with the liquid deposit) is not accurate, in response to the processor 124 determining that the ambient temperature is below a freezing temperature based on the temperature signal. In further response to same, the method 300 proceeds to block 314. The method 300 further includes determining, using the processor 124, that the temperature sensor 138 corroborates the first object sensor 104 and further that the primary classification associated with the liquid deposit is accurate, in response to the processor 124 determining that the ambient temperature is above the freezing temperature based on the temperature signal. In further response to same, the method 300 proceeds to block 310.

At block 310, the method 300 further includes generating, using the processor 124, the primary actuation signal based on the primary classification of the obscurity 128. The method 300 further includes transmitting, using the processor 124, the primary actuation signal to the primary lens treatment device 130.

At block 312, the method 300 further includes applying, using the primary lens treatment device 130, the primary remedy to the lens surface 114 in response to the primary lens treatment device 130 receiving the primary actuation signal from the processor 124. Continuing with the previous non-limiting example where the processor 124 determines that the primary classification is associated with the liquid deposit, the primary lens treatment device 130 can be the gas-based lens treatment device 122a (e.g., a compressed air delivery device) that applies the primary remedy in the form of the compressed gas to the lens surface 114 to remove the obscurity 128.

At block 314, the method 300 further includes counting, using the processor 124, a number of attempts taken to remove the obscurity 128 and comparing, using the processor 124, the number of attempts to a maximum threshold. If the processor 124 determines that the number of attempts is below the maximum threshold, the method 300 proceeds to block 316. If the processor 124 determines that the number of attempts is not below the maximum threshold, the method 300 proceeds to block 340.

At block 316, the method 300 further includes determining, using the processor 124, whether any portion of the obscurity 128 still remains on the lens surface 114 after the primary lens treatment device 130 applied the primary remedy to the lens surface 114. More specifically, if the processor 124 determines that any portion of the obscurity 128 remains on the lens surface 114 after the primary lens treatment device 130 applied the primary remedy to the lens surface 114, the method 300 proceeds to block 318. If the processor 124 does not determine that any portion of the obscurity is still on the lens surface 114 after the primary lens treatment device 130 applied the primary remedy to the lens surface 114, the method 300 returns to block 302. This block can be performed similar to block 304 where the system includes two or more sensors of different modalities directed to a common region.

At block 318, the method 300 further includes determining, using the DNN of the processor 124, the secondary classification of the obscurity based on the first object signal, in response to the processor 124 determining that the primary remedy did not remove the entire obscurity. Continuing with the previous example, the secondary classification is associated with the dirt deposit.

At block 320, the method 300 further includes generating, using the supplemental sensor 136, the supplemental signal associated with the obscurity and determining, using the processor 124, the accuracy of the secondary classification based on the supplemental signal. In this non-limiting example, the secondary classification of the obscurity 128 is associated with the dirt deposit, and the supplemental sensor 136 is a dirt detection sensor 140 (FIG. 2). The method 300 can include generating, using the dirt detection sensor 140, a dirt signal associated with the dirt deposit. The method 300 further includes determining, using the processor 124, that the dirt detection sensor 140 does not corroborate the first object sensor 104 and further that the secondary classification (e.g., associated with the dirt deposit) is not accurate, in response to the processor 124 determining that based on the dirt signal the dirt deposit is formed on the lens surface. In further response to same, the method 300 proceeds to block 326. The method 300 further includes determining, using the processor 124, that the dirt detection sensor 140 corroborates the first object sensor 104 and further that the secondary classification is accurate, in response to the processor 124 determining that based on the dirt signal the obscurity (e.g., the dirt deposit) is formed on the lens surface 114. In further response to same, the method 300 proceeds to block 322.

At block 322, the method 300 further includes generating, using the processor 124, the secondary actuation signal based on the secondary classification of the obscurity. The method 300 further includes transmitting, using the processor 124, the secondary actuation signal to the secondary lens treatment device 132.

At block 324, the method 300 further includes applying, using the secondary lens treatment device 132, the secondary remedy to the lens surface 114 in response to the secondary lens treatment device 132 receiving the secondary actuation signal from the processor 124. Continuing with the previous example where the secondary classification is associated with the dirt deposit, the secondary lens treatment device 132 can be the liquid-based lens treatment device 122*b* that applies the pressurized fluid delivered to the lens surface 114 to remove the obscurity 128.

At block 326, the method 300 further includes counting, using the processor 124, the number of attempts taken to remove the obscurity and comparing, using the processor 124, the number of attempts to the maximum threshold. If the processor 124 determines that the number of attempts is below the maximum threshold, the method 300 proceeds to block 328. If the processor 124 determines that the number of attempts is not below the maximum threshold, the method 300 proceeds to block 340.

At block 328, the method 300 further includes determining, using the processor 124, whether any portion of the obscurity remains on the lens surface 114 after the secondary lens treatment device 132 applied the secondary remedy to the lens surface 114. If the processor 124 determines that any portion of the obscurity remains on the lens surface 114 after the secondary lens treatment device 132 applied the secondary remedy to the lens surface 114, the method 300 proceeds to block 330. If the processor 124 determines that no portion of the obscurity is on the lens surface 114 after the secondary lens treatment device 132 applied the secondary remedy to the lens surface 114, the method 300 returns to block 302. This block can be performed similar to block 316.

At block 330, the method 300 further includes determining, using the processor 124, the tertiary classification of the obscurity based on the first object signal and in response to the processor 124 determining that the number of attempts is below the maximum threshold and in further response to the processor 124 determining that the tertiary remedy did not remove the entire obscurity. Continuing with the previous non-limiting example, the secondary classification is associated with the dirt deposit, and the tertiary classification is associated with the ice deposit.

At block 332, the method 300 further includes generating, using the supplemental sensor 136, the supplemental signal associated with the obscurity and determining, using the processor 124, the accuracy of the tertiary classification based on the supplemental signal. In one non-limiting example, the tertiary classification is associated with the ice deposit, and the supplemental sensor 136 is the temperature sensor 138. More specifically, in this non-limiting example, the method 300 includes generating, using the temperature sensor 138, the temperature signal indicative of the ambient temperature. The method 300 further includes determining, using the processor 124, that the temperature sensor 138 does not corroborate the first object sensor 104 and further that the tertiary classification associated with the ice deposit is not accurate, in response to the processor 124 determining that based on the temperature signal the ambient temperature is above the freezing point. In further response to same, the method 300 proceeds to block 338. The method 300 further includes determining, using the processor 124, that the temperature sensor 138 corroborates the first object sensor 104 and further that the tertiary classification associated with the ice deposit is accurate, in response to the processor 124 determining that based on the temperature signal the ambient temperature is below the freezing point. In further response to same, the method 300 proceeds to block 334.

At block 334, the method 300 further includes generating, using the processor 124, the tertiary actuation signal based on the tertiary classification of the obscurity. The method 300 further includes transmitting, using the processor 124, the tertiary actuation signal to the tertiary lens treatment device 134.

At block 336, the method 300 further includes applying, using the tertiary lens treatment device 134, the tertiary remedy to the lens surface 114 in response to the tertiary lens treatment device 134 receiving the tertiary actuation signal from the processor 124. Continuing with the previous example where the tertiary classification is associated with the ice deposit, the tertiary lens treatment device 134 can be the heat-based lens treatment device 122c (e.g., a resistance wire heating element) that transfers heat to the lens surface 114 to remove the obscurity 128.

At block 338, the method 300 further includes counting, using the processor 124, the number of attempts taken to remove the obscurity and comparing, using the processor 124, the number of attempts to the maximum threshold. If the processor 124 determines that the number of attempts is below the maximum threshold, the method 300 returns to block 302. If the processor 124 determines that the number of attempts is not below the maximum threshold, the method 300 proceeds to block 340. It is contemplated that other examples of the method can have more or fewer than three classifications and/or more or fewer than three lens treatment devices that apply associated remedies different from one another.

At block 340, the method 300 further includes generating, using the processor 124, an error report signal in response to the processor 124 determining that the number of attempts to restore the impaired object sensors is not below the maximum threshold. The report signal is associated with the impaired regions and the object sensors with obscurities to one or more downstream vehicle systems 142 (FIG. 2), such that those downstream vehicle systems 142 may adjust their affected functions only based on the regions that are intact. For example, many automotive cameras are shipped with auto-exposure feature inside. Without impairment information, exposure parameters can only be optimized globally, which can be misleading when portion of the image content is invalid. By injecting impairment status and location to the imaging pipeline, exposure optimization can be based on the intact region only, which results in optimal exposure control. By injecting impairment status and location to the downstream pipeline, system can screen out any results produced in the impaired regions and look to other intact sensors with overlapped field of view to cover the impaired region.

Figure 5:
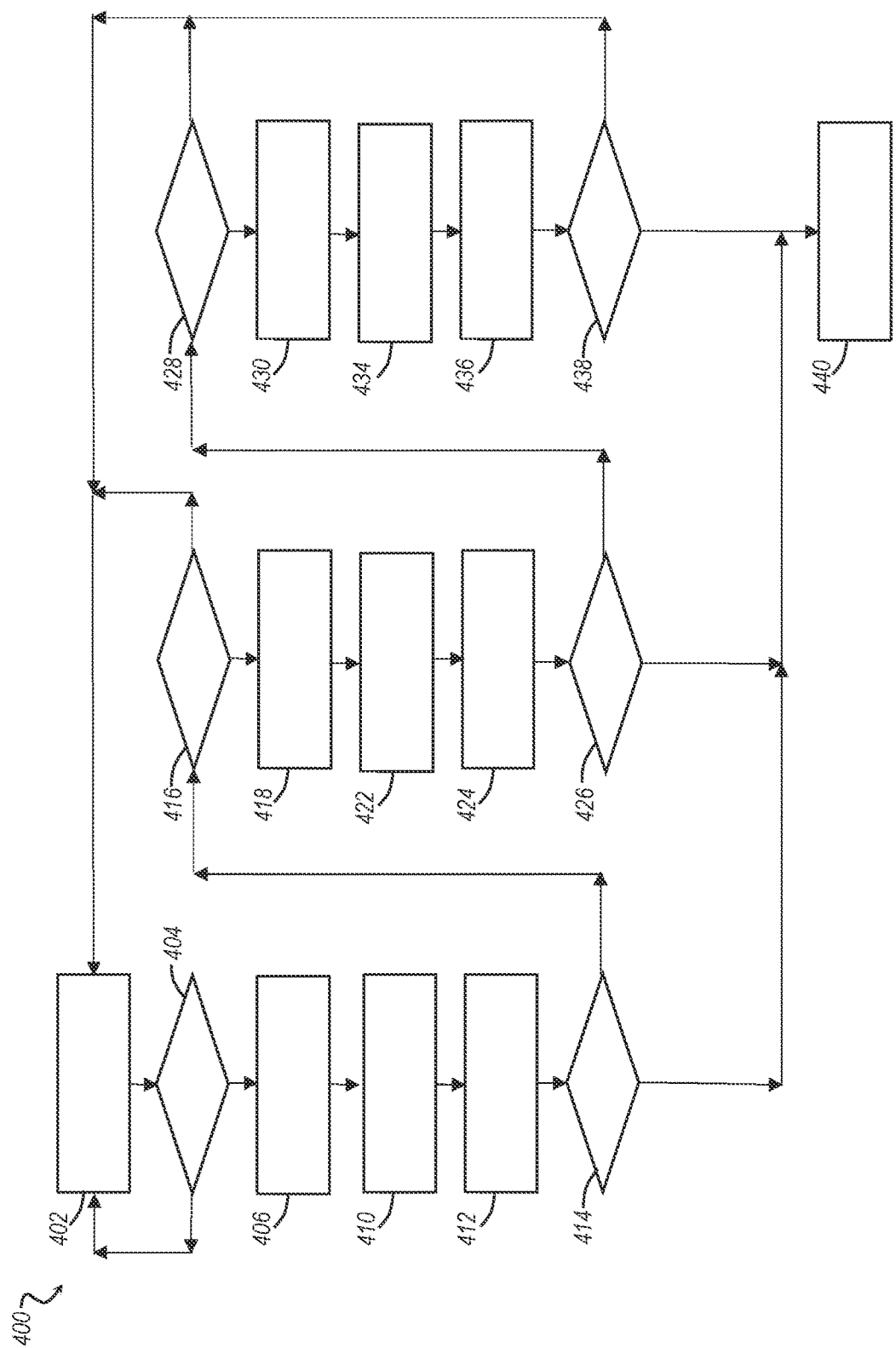
FIG. 5 is a flow chart of one example of a method for operating the self-cleaning sensor system of FIG. 3.

Referring to FIG. 5, a method 400 is similar to the method 300 of FIG. 3. However, while the method 300 includes blocks 308, 320, 332 directed to the supplemental sensors 136 corroborating one or more object sensors 104 (e.g., the cameras) for multi-modal sensor-based triggering, the method 400 does not include blocks 308, 320, 332 utilizing the supplemental sensors to corroborate the object sensors.

By getting impairment status as well as the location of impaired region, the sensor may adjust its affected functions only based on the region that is intact. For example, many automotive cameras are shipped with auto-exposure feature inside. Without impairment information, exposure parameters can only be optimized globally, which can be misleading when portion of the image content is invalid. By injecting impairment status and location to the imaging pipeline, exposure optimization can be based on the intact region only, which results in best exposure control.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A self-cleaning sensor system of a motor vehicle, the self-cleaning sensor system comprising: a plurality of object sensors, with each of the object sensors having a lens surface facing an associated one of a plurality of regions that are different from one another and located external to the motor vehicle, with each of the object sensors generating a signal associated with at least one of an image and a video of the associated regions; a plurality of lens treatment devices for applying an associated one of a plurality of remedies to the lens surface to remove an obscurity formed on the lens surface of the associated object sensor, where the remedies are different from one another and each of the remedies is configured to remove an associated classification of the obscurity from the lens surface, wherein the plurality of lens treatment devices include a heat-based lens treatment device for applying heat to the lens surface to remove the obscurity formed on the lens surface of the associated object sensor, a liquid-based lens treatment device for delivering a pressurized liquid to the lens surface to remove the obscurity formed on the lens surface of the associated object sensor, and a gas-based lens treatment device for delivering a compressed gas to the lens surface to remove the obscurity formed on the lens surface of the associated object sensor; a computer including at least one processor electrically communicating with each of the object sensors and the lens treatment devices, and the computer further including a non-transitory computer readable storage medium storing instructions, such that the at least one processor is programmed to utilize a multi-task neural network to: determine a classification of the obscurity in response to the at least one processor receiving the signal from the associated object sensor; generate an actuation signal based on the classification of the obscurity; and transmit the actuation signal to the associated lens treatment device; wherein the associated lens treatment device applies the associated remedy to the lens surface in response to the associated lens treatment device receiving the actuation signal from the at least one processor; wherein the at least one processor is further programmed to: determine that at least a portion of the obscurity is disposed on the lens surface after the lens treatment device applied the associated remedy to the lens surface; count a number of attempts taken to remove the obscurity; compare the number of attempts to a maximum threshold; and generate the actuation signal in response to the at least one processor determining that the number of attempts is below the maximum threshold; wherein the associated lens treatment device applies the associated remedy to the lens surface in response to the associated lens treatment device receiving the actuation signal from the at least one processor.

2. The self-cleaning sensor system of claim 1, wherein the at least one processor is further programmed to determine that the classification of the obscurity is associated with an ice deposit formed on the lens surface in response to the at least one processor receiving the signal from the associated object sensor.

3. The self-cleaning sensor system of claim 1, wherein the at least one processor is further programmed to determine that the classification of the obscurity is associated with a dirt deposit formed on the lens surface in response to the at least one processor receiving the signal from the associated object sensor.

4. The self-cleaning sensor system of claim 1, wherein the at least one processor is further programmed to determine that the classification of the obscurity is associated with a liquid deposit formed on the lens surface in response to the at least one processor receiving the signal from the associated object sensor.

5. A self-cleaning sensor system of a motor vehicle, the self-cleaning sensor system comprising:

a plurality of object sensors, with each of the object sensors having a lens surface facing an associated one of a plurality of regions that are different from one another and located external to the motor vehicle, with each of the object sensors generating an object signal associated with at least one of an image and a video of the associated regions;

a plurality of lens treatment devices for applying an associated one of a plurality of remedies to the lens surface to remove an obscurity formed on the lens surface of the associated object sensor, where the remedies are different from one another and each of the remedies is configured to remove an associated classification of the obscurity from the lens surface, and the lens treatment devices include a primary lens treatment device for applying a primary remedy to the lens surface, and a secondary lens treatment device for applying a secondary remedy to the lens surface;

a computer including at least one processor electrically communicating with each of the object sensors and the lens treatment devices, and the computer further including a non-transitory computer readable storage medium storing instructions, such that the at least one processor is programmed to utilize a multi-task neural network to:

determine a primary classification of the obscurity in response to the at least one processor receiving the object signal from the associated object sensor;

generate a primary actuation signal based on the primary classification of the obscurity; and transmit the primary actuation signal to the associated lens treatment device;

wherein the primary lens treatment device applies the primary remedy to the lens surface in response to the primary lens treatment device receiving the primary actuation signal from the at least one processor;

wherein the at least one processor is further programmed to:

determine that at least a portion of the obscurity is disposed on the lens surface after the primary lens treatment device applied the primary remedy to the lens surface;

count a number of attempts taken to remove the obscurity;

compare the number of attempts to a maximum threshold;

determine a secondary classification of the obscurity in response to the at least one processor determining that the number of attempts is below the maximum threshold and the primary remedy did not remove the obscurity;

generate a secondary actuation signal based on the secondary classification; and apply the secondary remedy to the lens surface in response to the secondary lens treatment device receiving the secondary actuation signal from the at least one processor.

6. The self-cleaning sensor system of claim 5, wherein the at least one processor is further programmed to:

determine that at least a portion of the obscurity is disposed on the lens surface after the secondary lens treatment device applied the secondary remedy to the lens surface;

count the number of attempts taken to remove the obscurity;

compare the number of attempts to the maximum threshold; and determine a tertiary classification of the obscurity in response to the at least one processor determining that the number of attempts is below the maximum threshold and the at least one processor further determining that the secondary remedy did not remove the obscurity;

generate a tertiary actuation signal based on the tertiary classification; and wherein the plurality of lens treatment devices further include a tertiary lens treatment device for applying a tertiary remedy to the lens surface in response to the tertiary lens treatment device receiving the tertiary actuation signal from the at least one processor.

7. The self-cleaning sensor system of claim 6, further comprising at least one supplemental sensor generating a supplemental signal associated with the obscurity, wherein the at least one processor determines an accuracy of at least one of the primary classification, the secondary classification, and the tertiary classification based on the supplemental signal.

8. The self-cleaning sensor system of claim 7, wherein the at least one supplemental sensor comprises a temperature sensor for generating a temperature signal indicative of an ambient temperature, and one of the primary classification, the secondary classification, and the tertiary classification of the obscurity is associated with an ice deposit formed on the lens surface, and the at least one processor determines that the primary classification of the ice deposit is not accurate in response to the temperature signal indicating that the ambient temperature is above a freezing temperature.

9. The self-cleaning sensor system of claim 8, wherein the primary lens treatment device, the secondary lens treatment device, and the tertiary lens treatment device comprises:

a gas-based lens treatment device for delivering a compressed gas to the lens surface to remove the obscurity formed on the lens surface of the associated object sensor;

a liquid-based lens treatment device for delivering a pressurized liquid to the lens surface to remove the obscurity formed on the lens surface of the associated object sensor; and a heat-based lens treatment device for applying heat to the lens surface to remove the obscurity formed on the lens surface of the associated object sensor.

10. A method for providing a self-cleaning sensor system having: a plurality of object sensors, with each of the object sensors having a lens surface facing an associated one of a plurality of regions that are different from one another and located external to the motor vehicle, with each of the object sensors generating a signal associated with at least one of an image and a video of the associated regions; a plurality of lens treatment devices for applying an associated one of a plurality of remedies to the lens surface to remove an obscurity formed on the lens surface of the associated object sensor, where the remedies are different from one another and each of the remedies is configured to remove an associated classification of the obscurity from the lens surface, wherein the plurality of lens treatment devices include a heat-based lens treatment device for applying heat to the lens surface to remove the obscurity formed on the lens surface of the associated object sensor, a liquid-based lens treatment device for delivering a pressurized liquid to the lens surface to remove the obscurity formed on the lens surface of the associated object sensor, and a gas-based lens treatment device for delivering a compressed gas to the lens surface to remove the obscurity formed on the lens surface of the associated object sensor; generating, using each of the object sensors, an object signal associated with at least one of an image and a video of the associated region; determining, using the at least one processor, a primary classification of the obscurity in response to the at least one processor receiving the object signal from the associated object sensor; generating, using the at least one processor, a primary actuation signal based on the primary classification of the obscurity; transmitting, using the at least one processor, the primary actuation signal to the primary lens treatment device; and applying, using a primary lens treatment device, a primary remedy to the lens surface in response to the primary lens treatment device receiving the primary actuation signal from the at least one processor determining, using the at least one processor, whether the obscurity is disposed on the lens surface after the primary lens treatment device applied the primary remedy to the lens surface; counting, using the at least one processor, a number of attempts taken to remove the obscurity; comparing, using the at least one processor, the number of attempts to a maximum threshold; determining, using the at least one processor, a secondary classification of the obscurity in response to the at least one processor determining that the number of attempts is below the maximum threshold and the at least one processor further determining that the primary remedy did not remove the obscurity; generating, using the at least one processor, a secondary actuation signal based on the secondary classification; and applying, using a secondary lens treatment device, a secondary remedy to the lens surface in response to the associated lens treatment device receiving the secondary actuation signal from the at least one processor.

11. The method of claim 10 further comprising:
determining, using the at least one processor, whether the obscurity is disposed on the lens surface after the secondary lens treatment device applied the secondary remedy to the lens surface;
counting, using the at least one processor, the number of attempts taken to remove the obscurity;
comparing, using the at least one processor, the number of attempts to the maximum threshold; and
determining, using the at least one processor, a tertiary classification of the obscurity in response to the at least one processor determining that the number of attempts is below the maximum threshold and the at least one processor further determining that the secondary remedy did not remove the obscurity;
generating, using the at least one processor, a tertiary actuation signal based on the tertiary classification; and
applying, using the tertiary lens treatment device, a tertiary remedy to the lens surface in response to the tertiary lens treatment device receiving the tertiary actuation signal from the at least one processor.

12. The method of claim 11 further comprising:
generating, using the at least one supplemental sensor, a supplemental signal associated with the obscurity; and
determining, using the at least one processor, an accuracy of at least one of the primary classification, the secondary classification, and the tertiary classification based on the supplemental signal.

13. The method of claim 12 further comprising:
generating, using a temperature sensor, a temperature signal indicative of an ambient temperature; and
determining, using the at least one processor, that at least one of the primary classification, the secondary classification, and the tertiary classification of the obscurity is associated with the ice deposit formed on the lens surface and is not accurate in response to the at least one processor determining that the temperature signal indicates that the ambient temperature is above a freezing temperature.

14. The method of claim 13 further comprising:
delivering, using a gas-based lens treatment device, a compressed gas to the lens surface to remove the obscurity formed on the lens surface of the object sensor;
delivering, using a liquid-based lens treatment device, a pressurized liquid to the lens surface to remove the obscurity formed on the lens surface of the object sensor; and
applying, using a heat-based lens treatment device, heat to the lens surface to remove the obscurity formed on the lens surface of the object sensor.

* * * * *